(12) United States Patent
Franck

(10) Patent No.: US 8,388,715 B2
(45) Date of Patent: *Mar. 5, 2013

(54) MODULAR APPARATUS FOR PROCESSING AIR, PARTICULARLY FOR CLASSIFIED ENVIRONMENTS AND FOOD ARTICLE MAKING PROCESSES IN GENERAL

(75) Inventor: Adam Franck, Sesto San Giovanni (IT)

(73) Assignee: Sinteco Impianti S.R.L., Sesto San Giovanni (MI) (IT)

( * ) Notice: Subject to any disclaimer, the term of this patent is extended or adjusted under 35 U.S.C. 154(b) by 210 days.

This patent is subject to a terminal disclaimer.

(21) Appl. No.: 12/660,801

(22) Filed: Mar. 4, 2010

(65) Prior Publication Data

US 2010/0251677 A1    Oct. 7, 2010

(30) Foreign Application Priority Data

Apr. 3, 2009  (IT) .............................. MI2009A0542

(51) Int. Cl.
*B01D 50/00*  (2006.01)

(52) U.S. Cl. .......... 55/385.2; 55/350.1; 55/356; 55/467; 55/482; 454/187

(58) Field of Classification Search ................. 55/385.1, 55/385.2, 356, 341.1, 350.1, 357, 378, 433, 55/472; 454/187, 66, 238; 95/287, 114; 138/149, 161, 106, 107; 428/304.4, 317.1, 428/317.7, 318.4, 319.1, 319.3, 319.7; 96/108, 96/134, 136, 125, 223, 225; 422/4, 121
See application file for complete search history.

(56) References Cited

U.S. PATENT DOCUMENTS

| | | | | |
|---|---|---|---|---|
| 3,230,033 | A * | 1/1966 | Hamilton et al. | 422/121 |
| 4,196,526 | A * | 4/1980 | Berti | 34/77 |
| 4,775,484 | A * | 10/1988 | Schmidt et al. | 210/673 |
| 5,064,453 | A * | 11/1991 | Jacquish | 96/112 |
| 5,154,742 | A * | 10/1992 | Gault et al. | 55/315.2 |
| 5,564,626 | A * | 10/1996 | Kettler et al. | 236/49.3 |
| 5,588,985 | A * | 12/1996 | Shagott et al. | 95/25 |
| 5,593,470 | A * | 1/1997 | Shagott et al. | 96/418 |
| 5,626,820 | A * | 5/1997 | Kinkead et al. | 422/122 |
| 5,713,791 | A * | 2/1998 | Long et al. | 454/187 |
| 5,827,339 | A * | 10/1998 | Nagafune et al. | 55/350.1 |
| 5,873,919 | A * | 2/1999 | Vross et al. | 55/315.1 |
| 7,048,776 | B2 * | 5/2006 | Moore et al. | 95/8 |
| 7,258,728 | B2 * | 8/2007 | Lim et al. | 95/287 |
| 7,270,872 | B2 * | 9/2007 | Peuramaki | 428/304.4 |
| 7,357,831 | B2 * | 4/2008 | Dancey et al. | 96/400 |
| 7,399,419 | B2 * | 7/2008 | Barbaro et al. | 210/791 |
| 7,749,380 | B2 * | 7/2010 | Yungner et al. | 210/143 |
| 2004/0194335 | A1 * | 10/2004 | Perret | 34/527 |
| 2004/0221721 | A1 * | 11/2004 | Prill | 95/280 |
| 2008/0078289 | A1 * | 4/2008 | Sergi et al. | 95/25 |
| 2008/0173178 | A1 * | 7/2008 | Metteer | 95/286 |
| 2010/0269946 | A1 * | 10/2010 | Franck | 138/149 |

FOREIGN PATENT DOCUMENTS

FR    2778456 A1 * 11/1998

* cited by examiner

*Primary Examiner* — Duane Smith
*Assistant Examiner* — Minh-Chau Pham
(74) *Attorney, Agent, or Firm* — Hedman & Costigan, P.C.; Kathleen A. Costigan

(57) ABSTRACT

A modular apparatus for processing air for classified environments and processes for preparing foods in general is constituted by a recovery air and outside air suction section with an optional free cooling fan; an air mixing section; a filtering section; a cold and hot battery section; a spacing section between the batteries of the cold and hot battery section; an air delivery ventilating section; an optional absolute filtering section; and an air delivery section.

4 Claims, 5 Drawing Sheets

MODULAR APPARATUS FOR PROCESSING AIR, PARTICULARLY FOR CLASSIFIED ENVIRONMENTS AND FOOD ARTICLE MAKING PROCESSES IN GENERAL

BACKGROUND OF THE INVENTION

The present invention relates to a modular apparatus for processing air, particularly for classified environments and food article making processes in general.

More specifically, the apparatus according to the present invention has been designed for application to all food article making fields for preparing meat, dairy, child and so on food articles, and also to other applications, such as in pharmaceutical, hospital, chemical, microelectronic, civil and nuclear fields.

SUMMARY OF THE INVENTION

The aim of the present invention is to provide a modular apparatus which is adapted to thermally and hygrometrically process air and control the temperature, moisture and filtering properties of classified environments.

Within the scope of the above mentioned aim, a main object of the invention is to provide such an apparatus which can be so sanitized and washed as to provide enhanced hygienic conditions, thereby eliminating any contaminating and dirt depositing risks, and providing a perfect quality processed air.

Another object of the present invention is to provide such an apparatus which is adapted to operate at a high temperature, to perform a sanitizing at a temperature greater than 80° C., to properly sterilize and microbiologically clean inner components of said apparatus.

Another object of the present invention is to provide such an apparatus including apparatus doors allowing apparatus inner components to be easily accessed, to easily and quickly clean them.

Another object of the present invention is to provide such an apparatus which can be easily customized depending on a lot of different specific requirements.

Another object of the present invention is to provide such an apparatus to continuously monitor the air being processed thereby.

Another object of the present invention is to provide such an apparatus which can be quickly and simply installed.

Another object of the present invention is to provide such an apparatus in which all the inner components may be easily disassembled, and which, moreover, generates a small noise and has a long useful duration.

Yet another object of the present invention is to provide such an apparatus which, owing to its specifically designed structural features, is very reliable and safe in operation.

According to one aspect of the present invention, the above mentioned aim and objects, as well as yet other objects, which will become more apparent hereinafter, are achieved by a modular apparatus, for processing air, particularly for classified environments and processes for preparing foods in general, characterized in that said apparatus comprises a recovery air and outside air suction section, said suction section optionally comprising a free cooling fan, an air mixing section, a filtering section, a cold and hot battery section, an optional spacing section between the batteries of said cold and hot battery sections, an air delivery ventilating section, an optional absolute filtering section and an air delivery section.

According to another aspect of the invention, the apparatus may also comprise a suction fan section, an ejecting section, an outside air suction section, a chemical dehumidification section including a wheel member, a heat recovery section, an active carbon filtering section and a humidification section.

BRIEF DESCRIPTION OF THE DRAWINGS

Further characteristics and advantages of the present invention will become more apparent hereinafter from the following detailed description of a preferred, though not exclusive, embodiment of the invention, which is illustrated, by way of an indicative, but not limitative example, in the accompanying drawings, where.

DESCRIPTION OF THE PREFERRED EMBODIMENTS

Figure 1:
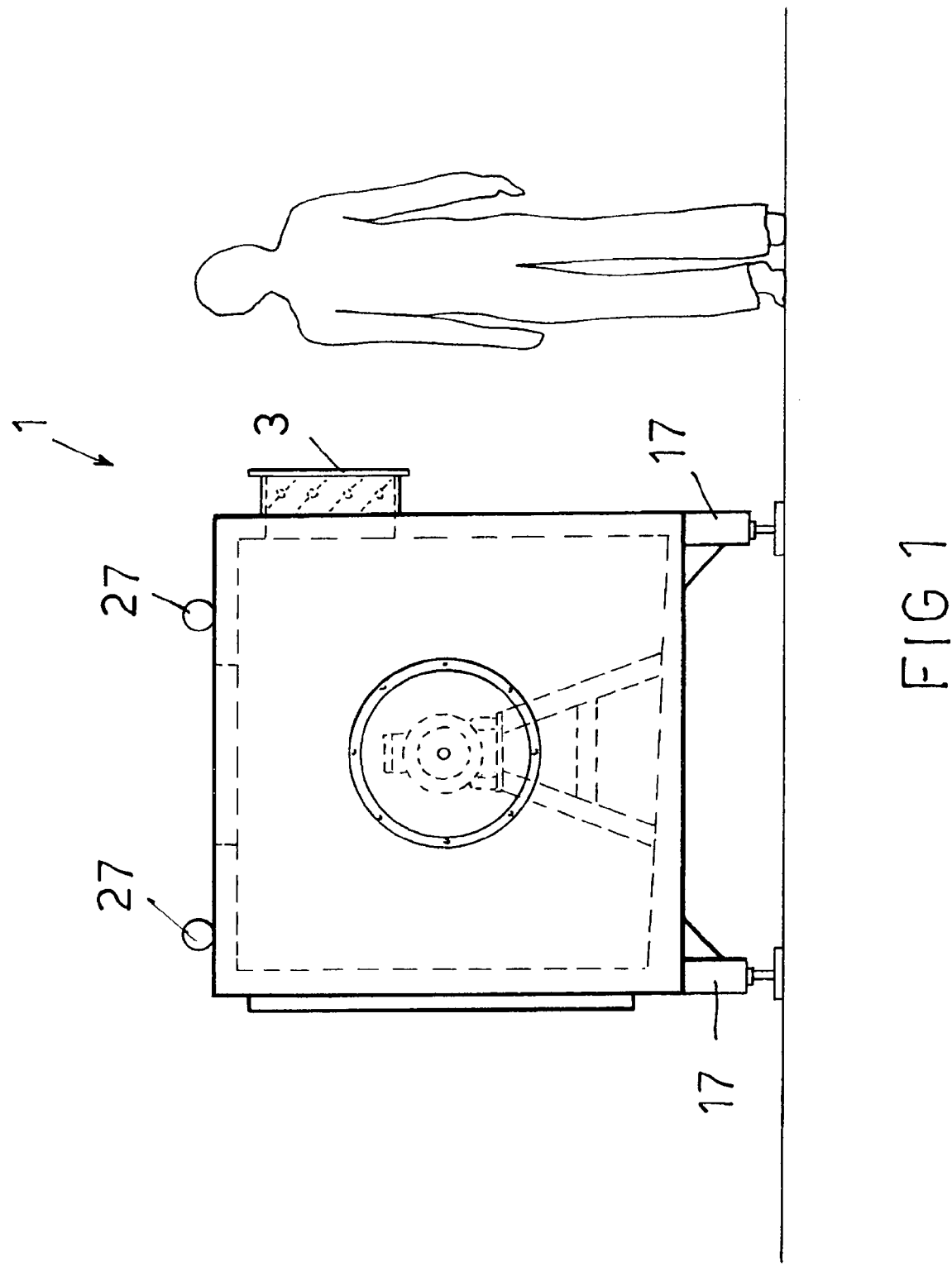
FIG. 1 is a front elevation view of the apparatus according to the present invention.
Figure 2:
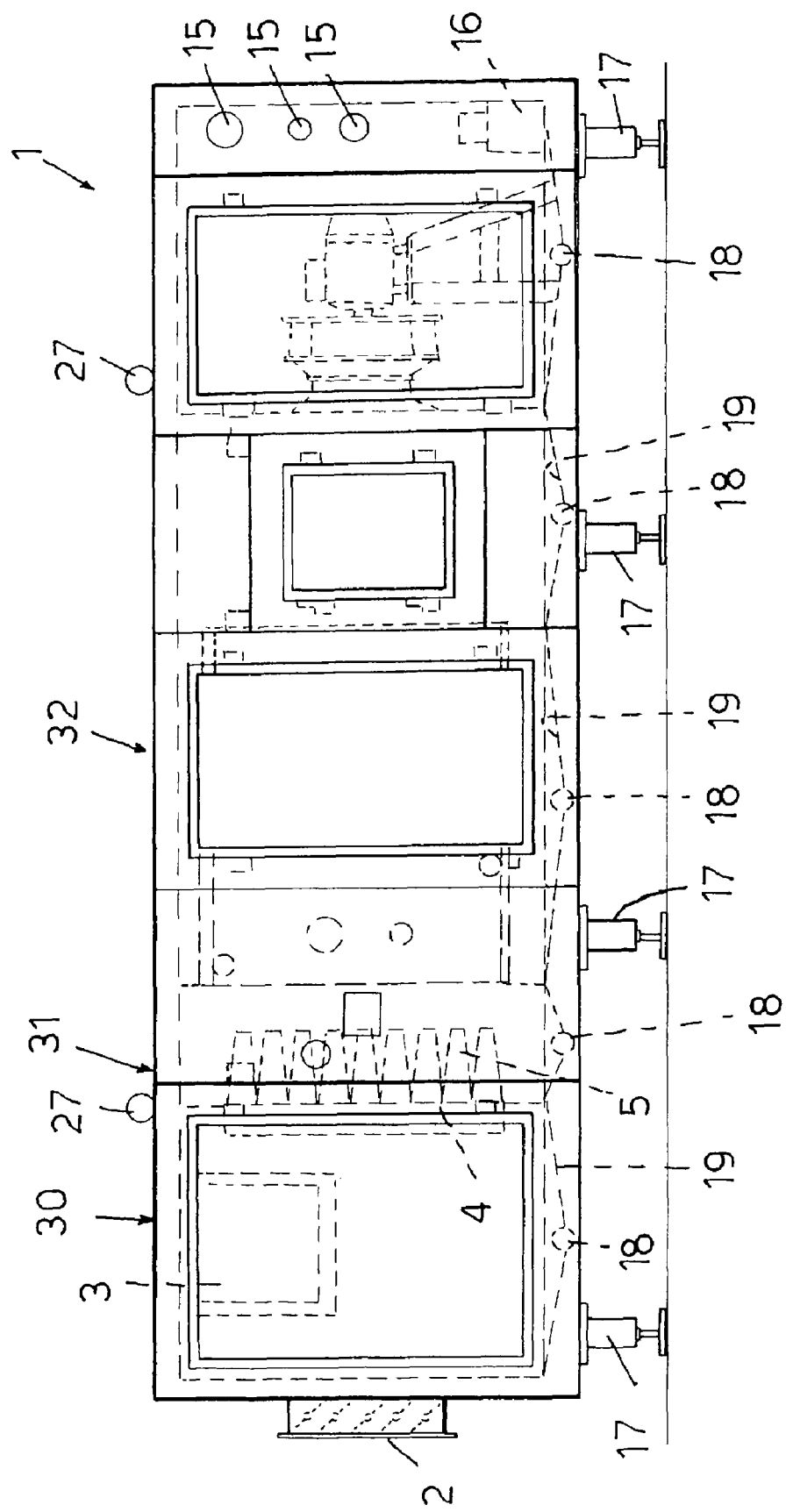
FIG. 2 is a cross-sectioned side elevation view of the apparatus according to the invention.
Figure 3:
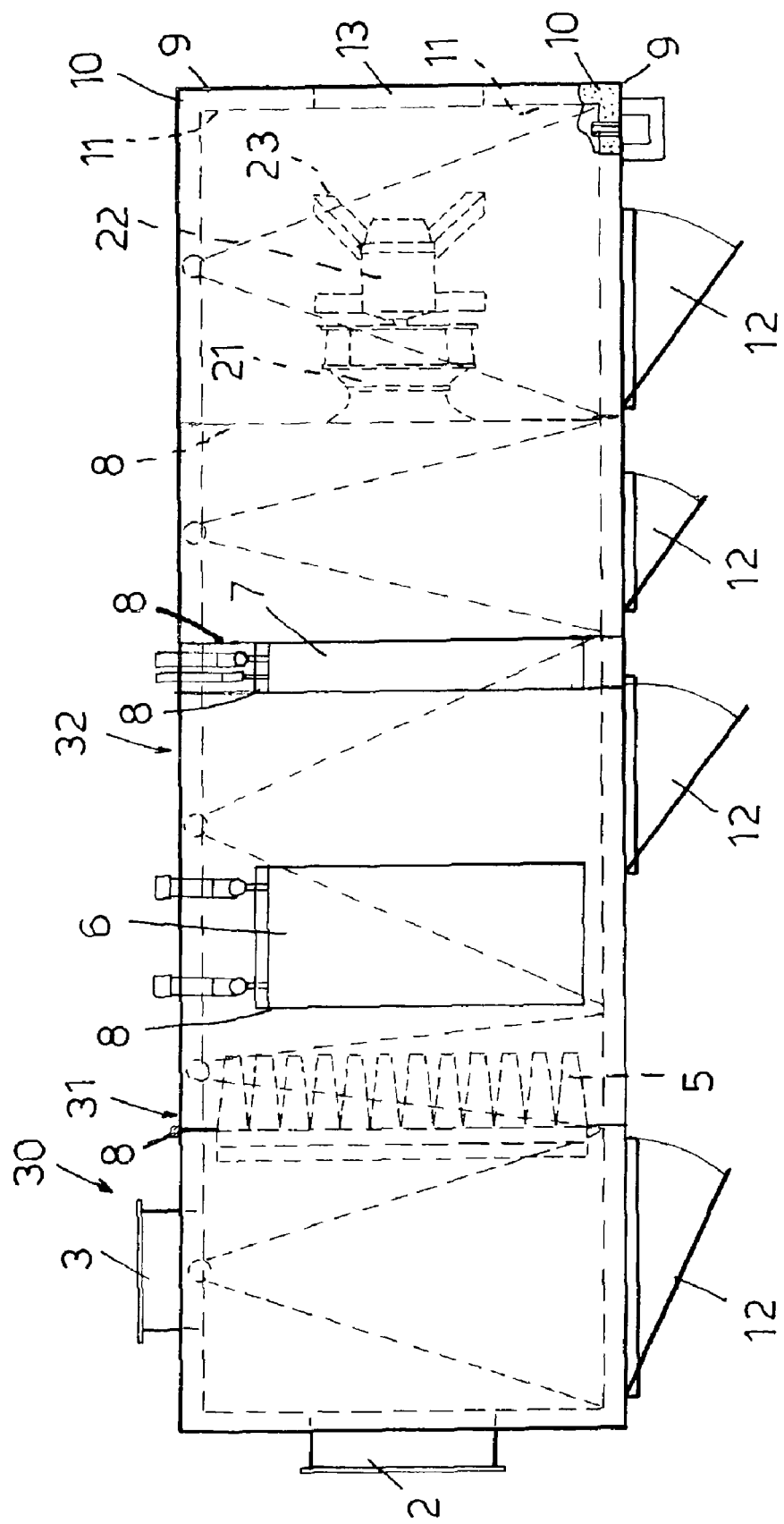
FIG. 3 is a top plan view of the apparatus according to the invention.
Figure 4:
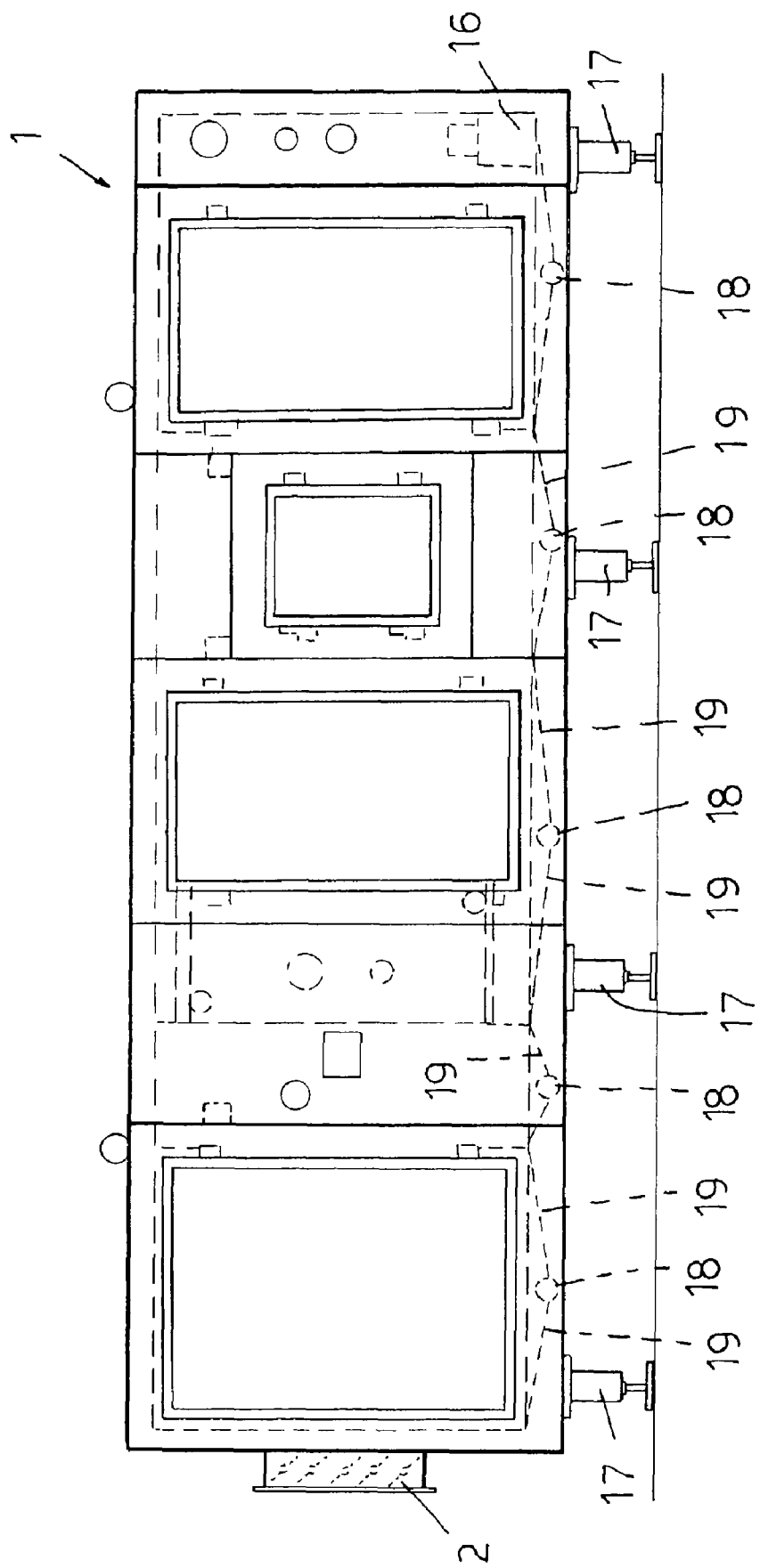
FIG. 4 is a side elevation view of the apparatus according to the invention.
Figure 5:
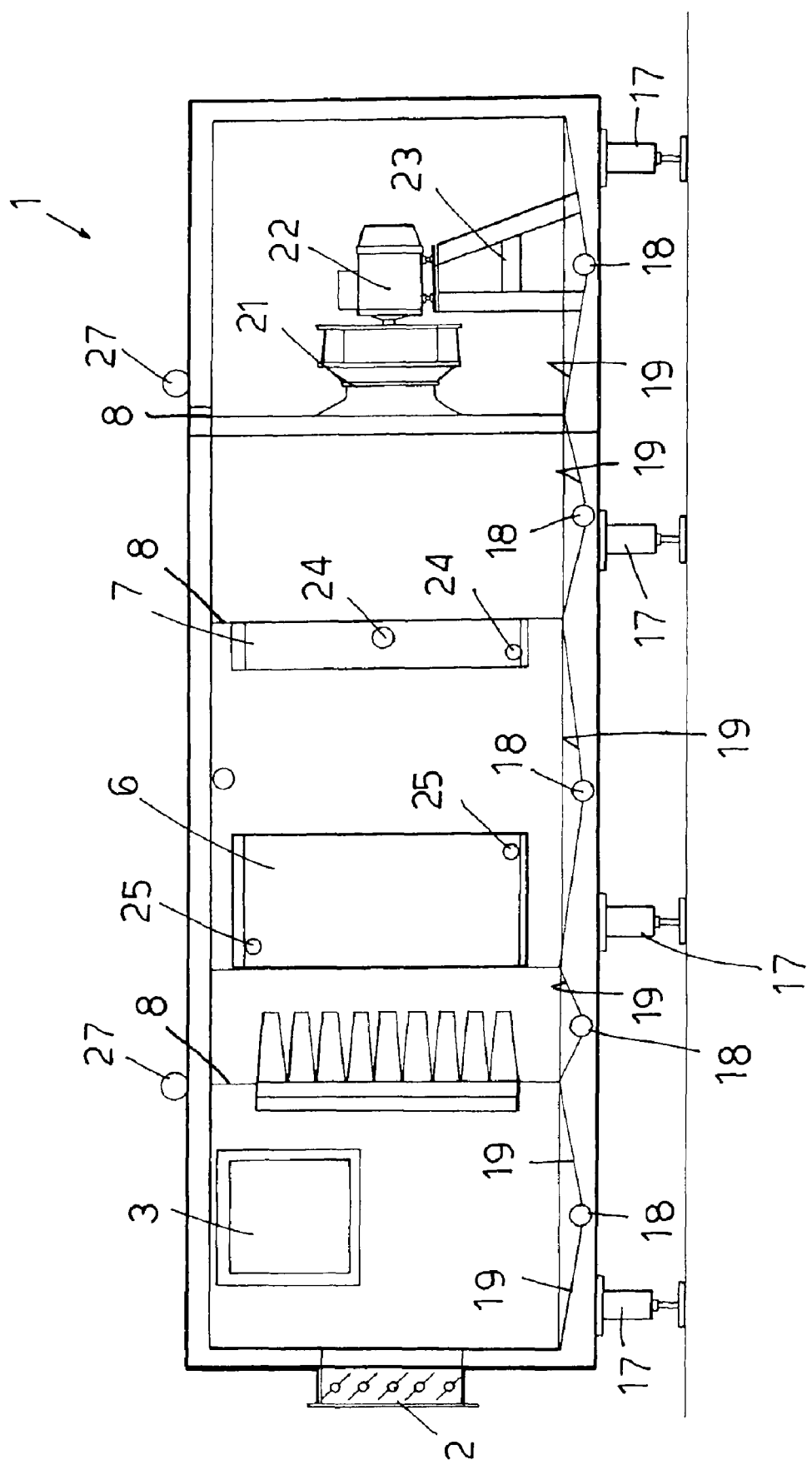
FIG. 5 is yet another cross-sectioned side elevation view of the apparatus according to the invention.

With reference to the number references of the above mentioned figures, the air processing apparatus according to the present invention, which has been generally indicated by the reference number 1, comprises an apparatus inner shell, which is advantageously made of a stainless steel material, which is selected based on the specific intended application; in particular an AISI 304 stainless steel material of a high thickness being preferably used.

According to the present invention, the inner shell comprises a plurality of modular sections, which are designed based on the characteristics of the apparatus and its inner components, and are continuously welded to one another.

Thus, each said modular section constitutes an apparatus section, and in each said sections the apparatus components are arranged.

The above modules are preferably made of smooth stainless steel sheet elements which are continuously welded preferably by a Tig welding method to provide a perfectly tight apparatus.

The number of said modules will depend on the apparatus construction.

A preferred basic structure comprises an recovery air suction section and an outer air suction section, generally indicated by the reference number 30, with an optional free-cooling fan.

The recovery air and outer air suction section comprises an environment recovery air louvered arrangement 2 and an outside air louvered arrangement 3.

To the air suction section an air mixing section is coupled, downstream of which is arranged an air filtering section 31 comprising a plurality of filters selected based on the desired filtering degree.

The filtering section comprises a stainless steel filter framework 4 supporting a plurality of filtering assembly 5.

The inventive apparatus comprises moreover a cold battery and hot battery section and a battery separating section for separating said batteries.

The battery section, generally indicated by the reference number 32, comprises a cold battery 6 and a hot battery 7, said cold and hot batteries being optionally separated by separating walls 8 and including respective connections for said hot battery 24 and said cold battery 25.

An air delivery ventilating section comprises a fan 21, driven by a driving motor 22 and arranged on a supporting assembly 23.

The apparatus, which may also comprise an optional absolute filtering section, also comprises an air delivery section having an outlet mouth 13.

Said apparatus may also comprise other optional auxiliary sections, based on the required characteristics and applications.

Said optional auxiliary sections may comprise a suction fan section, an ejecting section, an outer air drawing or suction section, a chemical dehumidification section including a related wheel member, a heat recovery section, an active carbon filtering section, and a humidification or moistening section.

The sequence, type and number of said sections being selected, as stated, based on the apparatus characteristics and technical requirements.

The doubly-slanted bottom 16 of each said section of the apparatus is characterized by an inclination or slope larger than 2%.

Said inclination or slope is about twice a conventional lozenge slope to assure a full removal both of the apparatus washing liquids and of condensate material forming during a normal operation of said apparatus.

Each said section comprises an independent drain 18 to favor water outflow and prevent stagnating regions, which would be a source of bacterial pollution and growth from forming.

According to a further feature of the present invention, the apparatus comprises furthermore a high density polyurethane insulating coating 10, being directly sprayed, said sprayed polyurethane insulating coating 10 being arranged between a sheet metal outer covering 9 and an inner stainless steel sheet metal element 11.

The above insulating coating may comprise a plurality of overlapping insulating material layers with a comparatively large thickness, while reducing to a minimum the thermal dispersion or loss through the walls of the apparatus, thereby providing a great power saving, much greater than that which could be achieved in conventional apparatus.

Actually, the above insulating coating and method provides a synergic cooperation between the stainless steel construction and insulating material, thereby providing an integral block apparatus, which is structurally very compact and rigid.

For special applications, for example for high temperatures, it would be also possible to use an intermediate thermally insulating material based on rock wool.

The outer finishing of the apparatus may be made by using any types of sheet metal elements, such as prepainted, galvanized or stainless steel metal sheet elements.

The apparatus according to the present invention comprises moreover accessing doors 12, and an electric box where the driving motor and switchgear, as well as a plurality of control instruments 15 are connected.

The apparatus is generally constructed, as stated, as a single-block unit.

In this connection, on the other hand, it should be also apparent that the inventive apparatus may be made starting from different prefabricated modules adapted to be easily and quickly reassembled in situ, in a case in which it would not be possible to install the apparatus as a single-piece.

All the inner components of the apparatus, as sated, may be withdrawn and so suspended as to leave the apparatus bottom free, to allow the apparatus inside to be deeply cleaned.

Actually, the apparatus is usually subjected to frequent and intensive washing operations.

The apparatus according to the present invention, moreover, can be easily installed on an installing floor, on adjustable foot elements 17 or it can be suspended to structures both of concrete and metal framework construction, by means of eyebolt supporting arrangements 27.

As the apparatus is installed on a floor, the adjustable foot elements 17 will leave a free space thereunder for performing the required cleaning operations.

The apparatus according to the present invention has a lot of functional and constructional advantages, comprising enhanced hygienic properties, a low bacteric load, and a total absence of thermal bridges.

Yet other advantages of the present invention are that the inventive apparatus operates in a nearly noiseless manner, has a very good accessibility, may be quickly and simply installed and has a long useful life.

It has been found that the invention fully achieves the intended aim and objects.

In practicing the invention, the used materials, and the contingent size and shapes, can be any, according to requirements.

The invention claimed is:

1. A modular apparatus for processing air for use in classified environments and processes for preparing meat, dairy and child food and for a pharmaceutical, hospital, chemical, microelectronic, civil and nuclear field applications, said apparatus comprising a recovery air and outside air suction section, said suction section optionally comprising a free cooling fan, an air mixing section, a filtering section, a cold and hot battery section, a spacing section between the batteries of said cold and hot battery section, an air delivery ventilating section, an optional absolute filtering section, an air delivery section, a suction fan section, an ejecting section, an outside air suction section, a chemical dehumidification section including a wheel member, a heat recovery section, an active carbon filtering section, and a humidification section, wherein said apparatus comprises moreover an inner stainless steel shell, constituted by a plurality of modular sections continuously welded to one another, each modular section constituting a section of the apparatus, each said modular section being made of welded smooth stainless steel sheet metal elements coupled to one another by a continuous weldement, said recovery air and outside air suction section comprising an environment recovery air louvered arrangement and an outside air louvered arrangement, wherein said filtering section comprises a stainless steel filter framework supporting a plurality of filtering assemblies, wherein said cold and hot batteries are separated by separating walls and include a first connection for said hot battery and a second connection for said cold battery, wherein said air delivery ventilating section comprises a motor driven fan arranged on a supporting assembly, and an outlet mouth, and wherein said apparatus also comprises access doors allowing to access said modular sections to sterilize said modular sections at a sterilizing temperature greater than 80° C.

2. An apparatus, according to claim 1, wherein each said section comprises a doubly-slanted bottom, including a slanting portion having a slope larger than 2%, to assure a full removal both of the apparatus washing liquids and of condensate material forming in said apparatus during its normal operation, each said section comprising an independent drain to favor water outflow and prevent stagnating regions from forming.

3. An apparatus, according to claim 1, wherein said apparatus comprises moreover a sprayed-on high density polyurethane insulating coating arranged between a sheet metal outer covering and an inner stainless steel sheet metal.

4. An apparatus, according to claim 1, wherein said apparatus comprises moreover a plurality of adjustable foot assembly for installing said apparatus on an installing floor and a plurality of eyebolt assemblies for hanging said apparatus both to civil structures and to metal framework structures.

* * * * *